(12) United States Patent
Haas et al.

(10) Patent No.: US 8,352,945 B2
(45) Date of Patent: Jan. 8, 2013

(54) SYSTEM, METHOD, AND APPARATUS FOR SCAN-SHARING FOR BUSINESS INTELLIGENCE QUERIES IN AN IN-MEMORY DATABASE

(75) Inventors: Peter J Haas, San Jose, CA (US); Lin Qiao, San Jose, CA (US); Vijayshankar Raman, Sunnyvale, CA (US); Frederick R Reiss, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 12/539,471

(22) Filed: Aug. 11, 2009

(65) Prior Publication Data

US 2011/0040744 A1 Feb. 17, 2011

(51) Int. Cl.
 *G06F 7/00* (2006.01)
 *G06F 17/30* (2006.01)
(52) U.S. Cl. ..................................................... 718/101
(58) Field of Classification Search .................... None
 See application file for complete search history.

(56) References Cited

U.S. PATENT DOCUMENTS

| | | | |
|---|---|---|---|
| 6,421,666 B1 | 7/2002 | Murthy et al. | |
| 6,950,834 B2 | 9/2005 | Huras et al. | |
| 6,985,904 B1 | 1/2006 | Kaluskar et al. | |
| 7,349,925 B2 * | 3/2008 | Cherkauer et al. | 1/1 |
| 2004/0088487 A1 * | 5/2004 | Barroso et al. | 711/122 |
| 2007/0271570 A1 * | 11/2007 | Brown et al. | 718/105 |
| 2007/0294219 A1 | 12/2007 | Cherkauer et al. | |
| 2009/0199219 A1 * | 8/2009 | Rofougaran et al. | 719/330 |

OTHER PUBLICATIONS

O'Gorman et al, Multiple Query Optimization by Cache-Aware Middleware using Query Teamwork 02, University of California, pp. 1-24.*

Chaudhuri et al., An Overview of Data Warehousing and OLAP Technology Mar. 1997, ACM SIGMOD Record, vol. 26 Issue 1, pp. 65-74.*

Petrou et al, Implementing Lottery Scheduling: Matching the Specializations in Traditional Schedulers Jun. 6-11, 1999, USENIX, 15 pages.*

Chen et al. "Exploiting Highlevel Coherence Information to Optimize Distributed Shared State". Proceedings of the ACM SIGPLAN Symposium on Principles and Practice of Parallel Programming (PPoPP 2003) and Workshop on Partial Evaluation and Semantics-Based Program Manipulation (PEPM 2003), vol. 19, Issue 10, (Oct. 2003), pp. 131-142.

Cao et al "Optimizing Complex Queries with Multiple Relation Instances". International Conference on Management of Data, (2008), pp. 525-538.

Harizopoulos et al. "QPipe: A Simultaneously Pipelined Relational Query Engine". International Conference on Management of Data, (2005), pp. 383-394.

"Intel Architecture Software Developer's Manual vol. 2: Instruction Set Reference", 854 pages.

Qiao et al. "Overcoming the I/O Bottleneck in BI Queries". VLDB, (2008).

* cited by examiner

*Primary Examiner* — Jason Liao
(74) *Attorney, Agent, or Firm* — Jeffrey T. Holman

(57) ABSTRACT

A computer-implemented method for scan sharing across multiple cores in a business intelligence (BI) query. The method includes receiving a plurality of BI queries, storing a block of data in a first cache, scanning the block of data in the first cache against a first batch of queries on a first processor core, and scanning the block of data against a second batch of queries on a second processor core. The first cache is associated with a first processor core. The block of data includes a subset of data stored in an in-memory database (IMDB). The first batch of queries includes two or more of the BI queries. The second batch of queries includes one or more of the BI queries that are not included in the first batch of queries.

18 Claims, 8 Drawing Sheets

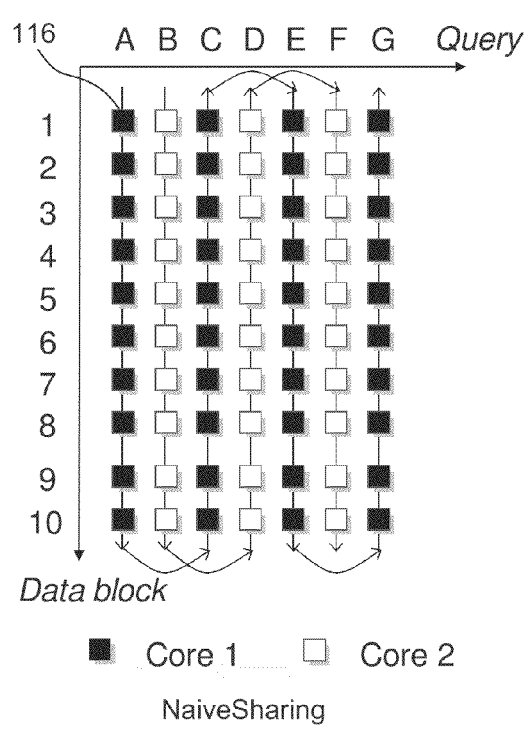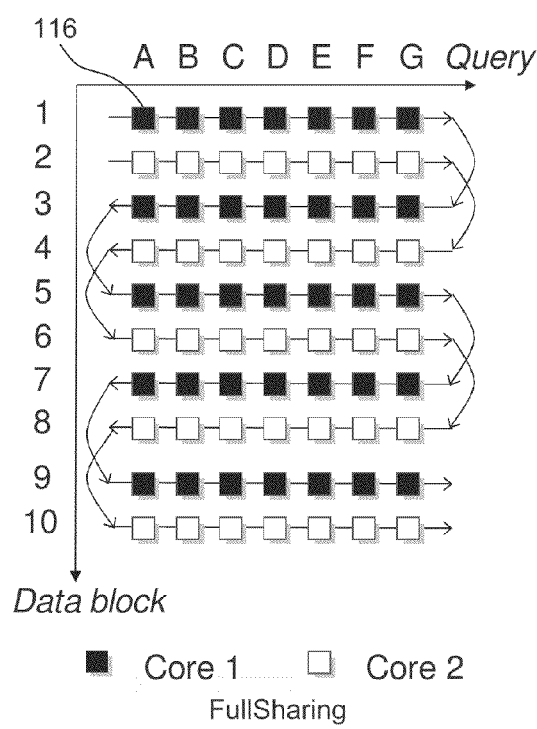
FIG. 3a
FIG. 3b

800

1: $T, q$: table and query under consideration
2: $\sigma^*, \gamma$: selectivity and WS-size cutoff values
3: $d^* = C - B$: agg-table threshold
4: $\delta_1, \delta_2, \delta_1', \delta_2'$: indifference-zone values
5: $p$: maximum allowed error probability
6: $n_{min}, n_{max}$: minimum and maximum sample sizes
7:
8: //test selectivity
9: $m \leftarrow n_{min}$
10: $T' \leftarrow \text{SAMPLE}(T, m)$    //take pilot sample
11: $\hat{\sigma} \leftarrow m^{-1} \sum_{i=1}^{m} X_i$
12: $\hat{\alpha} \leftarrow ((m-1)^{-1} \sum_{i=1}^{m} (X_i - \hat{\sigma})^2)^{\frac{1}{2}}$
13: $n \leftarrow (2\hat{\alpha} z_{1-p}/\delta_1)^2 \vee n_{min}$
14: if $n > n_{max}$ then return "never-share"
15: $T' \leftarrow \text{SAMPLE}(T, n)$    //take actual sample
16: $\hat{\sigma} \leftarrow n^{-1} \sum_{i=1}^{n} X_i$
17: $\hat{\alpha} \leftarrow ((n-1)^{-1} \sum_{i=1}^{n} (X_i - \hat{\sigma})^2)^{1/2}$
18: $\epsilon \leftarrow \left( (\hat{\alpha} z_{1-p} n^{-1/2}) - \delta_2 \right)^+$
19: if $\hat{\sigma} < \sigma^* - \epsilon$ then return "always-share"  //selectivity test
20:
21: //estimate WS size
22: $W \leftarrow \emptyset; i \leftarrow 0$    //initialize
23: while true do
24:   $\text{INCREMENTSAMPLE}(W, T, q, i)$
25:   if $i > n_{max}$ then return "never-share"
26:   if $\text{DISTINCT}(W) > d^*$ then return "never-share"
27:   $f_1 \leftarrow \text{NUMWITHFREQ}(W, 1)$
28:   $f_2 \leftarrow \text{NUMWITHFREQ}(W, 1)$
29:   $\beta \leftarrow \left( (f_1/n) + 2(f_2/n) - (f_1/n)^2 \right)^{1/2}$
30:   $n' \leftarrow (2\beta z_{1-p}/\delta_2')^2 \vee n_{min}$
31:   if $|W| \geq n'$ then    //is $|W|$ big enough for testing?
32:     $\hat{V} \leftarrow 1 - (f_1/|W|)$
33:     $\epsilon' \leftarrow \left( (\beta z_{1-p} n^{-1/2}) - \delta_1' \right)^+$
34:     if $\hat{V} > \gamma + \epsilon'$ then return $\text{DISTINCT}(W)$
35:   end if
36: end while

FIG. 8

SYSTEM, METHOD, AND APPARATUS FOR SCAN-SHARING FOR BUSINESS INTELLIGENCE QUERIES IN AN IN-MEMORY DATABASE

BACKGROUND

Historically, business intelligence (BI) systems have been an input/output (I/O) bound workload. Business data is stored on the disks of a data warehouse, and retrieving data from these disks is the main cost in query execution. The state of the art in BI has been defined by this I/O bottleneck: low-end systems spend most of their time waiting for disk I/O, while high-end systems use large numbers of disks to achieve high throughput at great financial cost.

Researchers have developed several techniques to alleviate this bottleneck by reducing the amount of data a query processor needs to touch. These techniques include aggressive compression, column stores, and materialized views. With the advent of large main memories, these techniques often allow the entire working set of a BI system to fit in random access memory (RAM), bypassing the traditional disk I/O bottleneck. For the first time, BI has become CPU-bound.

Unfortunately, recent trends in hardware are bringing this new era quickly to an end. Processor manufacturers are putting ever increasing numbers of cores onto a CPU die, and main memory bandwidth is not keeping pace. Now, in a query using multiple cores, accessing main memory often becomes the bottleneck. With manufacturers soon to put 6 and 8 cores on a single chip, this problem will only become worse.

Today, major processor vendors are shipping processors equipped with 4 separate processing cores, with 6- and 8-core processors in the pipeline. Each core in a multi-core processor is an independent CPU; this CPU sits at the top of a memory hierarchy consisting of 2-3 levels of cache and a relatively slow main memory. Each core has a private level-1 (L1) cache that is very fast, but very small. Larger level-2 (L2) and, often, level-3 (L3) caches provide slower access to larger amounts of memory. Typically, the largest cache is shared across all cores on the processor die, while each processor maintains its own private cache at the higher caching layers. For example, the Advanced Micro Devices® Opteron™ processor has a shared L3 cache and private L1 and L2 caches.

At each level of the hierarchy, performance drops by one to two orders of magnitude. Storage capacity follows a different trajectory, increasing by a factor of 2-4 at each cache layer, with a dramatic jump in capacity at the main memory layer. Even the largest processor caches represent less than half of one percent of a modern computer's memory.

This cache/memory hierarchy is somewhat similar to the memory/disk hierarchy for which mainstream database systems were designed, with cache taking the place of the buffer pool and main memory taking the place of disk. However, there are two important differences.

First of all, control of this memory hierarchy is implemented mostly in hardware, with the cache and memory controllers making most low-level decisions about which regions of memory reside in which level of the hierarchy. Modern CPUs provide a few instructions to "suggest" policy changes to the hardware (e.g., Advanced Micro Devices® x86-64 prefetch instructions), but these mechanisms do not provide the flexibility and control that a typical database buffer pool enjoys. In addition, many of the low-level synchronization primitives needed to implement a buffer pool within the L2 cache are themselves as expensive as a cache miss.

The second difference is one of scale. Even large L2 and L3 caches are typically less than 10 MB in size, which is smaller than database buffer pools have been for many years. Business intelligence (BI) queries are highly complex, and running them efficiently requires keeping a large "working set" in cache, including indexes, intermediate data structures, and executable code.

Database management systems (DBMSs) have always aimed to share the results of I/O among concurrent tasks, through the buffer manager. Many recent systems explicitly synchronize concurrent queries to improve the amount of I/O that can be shared at the buffer pool, by grouping together queries that run at similar speeds. Unlike the previous systems, for main-memory DBMSs, the sharing occurs in L2 cache and not in memory. This buffer pool model does not lend itself well to the implementation within the L2 cache. The much smaller cache sizes (when compared to memory) means that the combined working set of the queries often fails to fit. The thrashing of the working set leads to significant I/O that competes with the table I/O.

SUMMARY

Embodiments of a computer program product are described. In one embodiment, the computer program product includes a computer useable storage medium to store a computer readable program that, when executed on a computer, causes the computer to perform operations, including an operation to receive a plurality of queries, store a block of data in a first cache, scan the block of data in the first cache against a first batch of queries, and scan the block of data against a second batch of queries. The first cache is associated with a first processor core. The block of data includes a subset of data stored in an in-memory database (IMDB). The block of data is scanned against the first batch of queries on the first processor core. The first batch of queries includes two or more of the BI queries. The block of data is scanned against the second batch of queries on the second processor core. The second batch of queries includes one or more of the BI queries that are not included in the first batch of queries. Other embodiments of the computer program product are also described.

Embodiments of a computer-implemented method are also described. In one embodiment, the computer-implemented method is a method for improving performance of business intelligence (BI) queries using scan-sharing. The method includes receiving a plurality of BI queries, storing a first block of data in a first cache associated with a first processor core, storing a second block of data in a second cache associated with a second processor core, scanning the first block of data in the first cache against a batch of queries on the first processor core, and scanning the second block of data in the second cache against the batch of queries on the second processor core. The first block of data includes a first subset of data stored in an in-memory database (IMDB). The second block of data includes a second subset of data stored in the IMDB. The batch of queries includes two or more of the BI queries. Other embodiments of the computer-implemented method are also described.

Embodiments of a system are also described. In one embodiment, the system is a system for improving performance of business intelligence (BI) queries using scan-sharing. In one embodiment, the system includes a query scheduler, a cache, a first processor core, and a second processor core. The query scheduler is configured to receive a plurality of BI queries. The query scheduler is also configured to create a first batch of queries including two or more queries. At least one of the two or more queries in the first batch of queries includes a query of the plurality of BI queries. The query scheduler is also configured to create a second batch of queries including two or more queries. The cache stores a block of data including a subset of data stored in an in-memory database (IMDB). The first processor core is connected to the cache and configured to scan the block of data against the first batch of queries. The second processor core is connected to the cache and is configured to scan the block of data against the second batch of queries. Other embodiments of the system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 3a depicts a schematic diagram of one embodiment a method for processing queries across multiple processor cores.

FIG. 3b depicts a schematic diagram of one embodiment another method for processing queries across multiple processor cores.

FIG. 8 depicts one embodiment of a method for query classification and working set size estimation.

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Shared scans have been used in the past to overcome disk I/O bottlenecks, but bringing the technique to main-memory DBMS's poses significant challenges. Disk-based systems use programmable buffer pools and dedicated I/O threads to implement scan sharing. Different queries share data via the buffer pool, and a buffer manager choreographs the reading of data into the pool.

In a main memory database, however, the processor cache takes the place of the buffer pool, with the cache controller hardware determining the data that resides in cache. In such an environment, scan sharing requires careful scheduling of low-level query operations, ensuring that data is resident in the cache when it is needed.

This scheduling is complicated by the fact that processor caches are significantly smaller than buffer pools. The working set (auxiliary data structures like hash tables and dimension tables) of a small group of queries can easily exceed the size of cache, leading to thrashing. An implementation of scan sharing needs to estimate the working set sizes of queries and to avoid grouping too many queries together. Efficiently predicting the working set size of a query, e.g., by sampling, is a non-trivial problem.

In certain embodiments, a query scheduler arranges a plurality of BI queries into batches and assigns the batches for processing to reduce memory I/O and improve performance of the BI queries. While many embodiments are described herein, at least some of the described embodiments receive a plurality of BI queries, store a block of data from an IMDB in a cache, scan the block of data against a first batch of queries using a first processor core, and scan the block of data against the second batch of queries using a second processor core.

Figure 1:
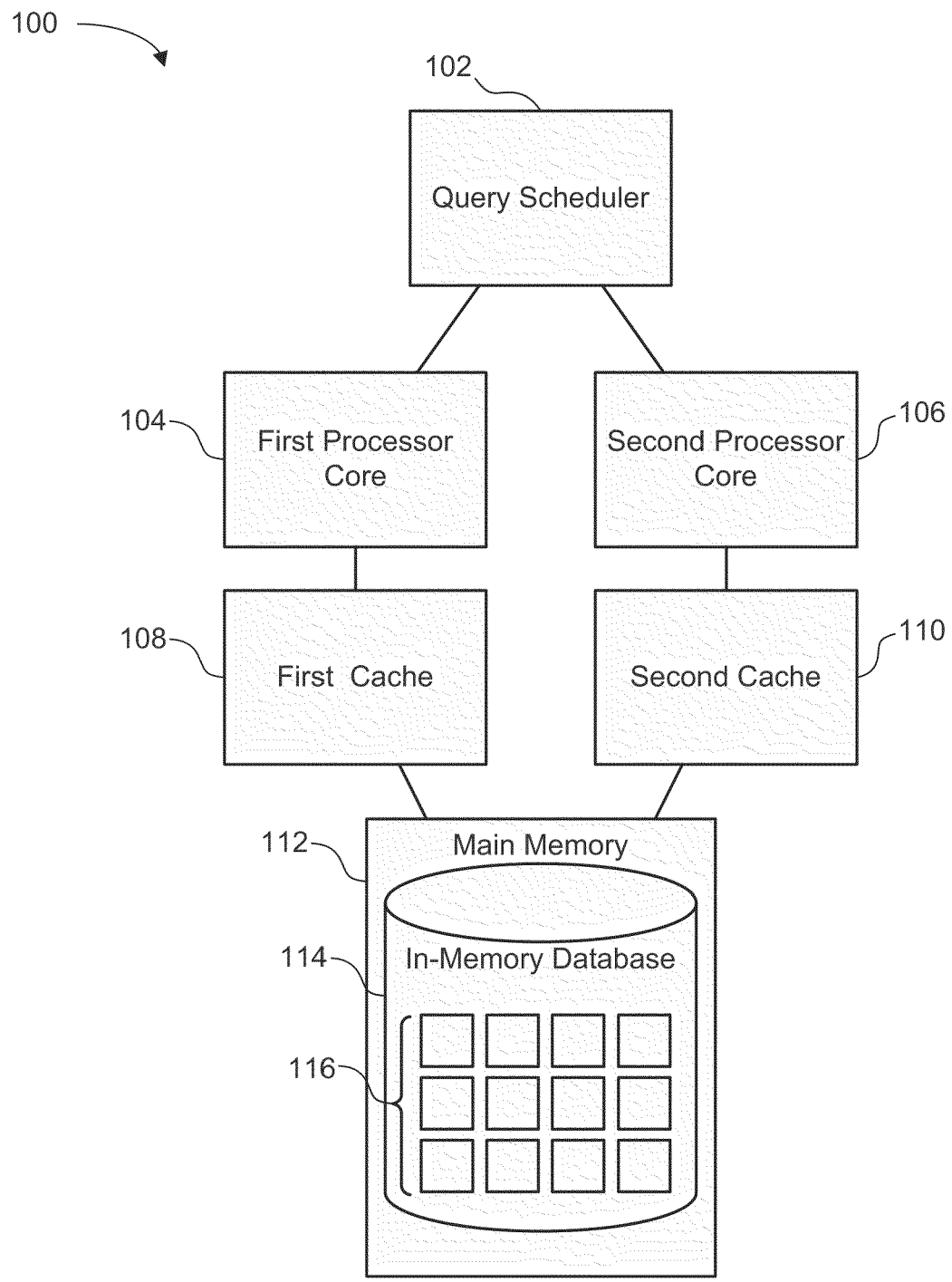
FIG. 1 depicts a schematic diagram of one embodiment of a system for scan-sharing in an in-memory database.

FIG. 1 depicts a schematic diagram of one embodiment of a system 100 for scan-sharing in an in-memory database 114. The system 100 includes a query scheduler 102, a first processor core 104, a second processor core 106, a first cache 108, a second cache 110, and a main memory 112. Embodiments of the system 100 increase the throughput of complex queries executed in parallel.

The query scheduler 102, in one embodiment, schedules queries for execution. In certain embodiments, the query scheduler 102 receives a plurality of BI queries. The query scheduler 102 determines how and when to execute the queries.

In one embodiment, the query scheduler 102 assigns the queries to a processor core for execution. In certain embodiments, the query scheduler 102 assigns a plurality of queries to a processor core for execution against a block of data.

In some embodiments, the query scheduler 102 further determines a block of data for the query to scan. In one embodiment, the query scheduler 102 is configured to improve the performance of query execution by implementing a scan-sharing strategy that decreases the amount of memory I/O used by scanning a block of data stored in a cache against multiple queries.

The query scheduler 102, in one embodiment, is implemented in hardware. For example, the query scheduler 102 may include one or more computer chips configured to execute the functions of the query scheduler 102. In another embodiment, the query scheduler 102 may be implemented in software. For example, the query scheduler 102 may be a component of a database management system (DBMS) such as the Blink query processor. In yet another embodiment, the query scheduler 102 is a combination of hardware and software components. The query scheduler 102 is described in greater detail in relation to FIG. 2.

The first processor core 104, in one embodiment, is an integrated circuit configured to execute computer code. The first processor core 104 may be any type of processor core, including a central processing unit (CPU) or a graphics processing unit (GPU). The first processor core 104 may be the only processor core on a die, or it may be one of many processor cores on a die in a multi-core chip.

The second processor core 106, in some embodiments, is similar to the first processor core 104 described above. The second processor core 106 may be on a separate chip from the first processor core 104, or it may be a separate core on the same chip as the first processor core 104. In some embodiments, the second processor core 106 may be a different type of processor core than the first processor core 104. For example, the first processor core 104 may be a core in a GPU, and the second processor core 106 may be a core in a CPU.

The first cache 108, in one embodiment, is a memory storage device that can be read by the first processor core 104 quickly relative to the speed that the first processor core 104 can read the main memory 112. The first cache 108 is accessible by the first processor core 104. In some embodiments, the first cache 108 is on the same die as the first processor core 104. An example of a first cache 108 is a 64 kilobyte (KB) level 1 (L1) cache associated with one processor core in an Intel® Xeon™ CPU. Another example of a first cache 108 is a 4 megabyte (MB) level 2 (L2) cache associated with two processor cores in an Intel® Xeon™ CPU. Other embodiments may use other types of cache.

The second cache 110, in some embodiments, is similar to the first cache 108 described above. In one embodiment, the second cache 110 is accessible by the second processor core 106. The second cache 110, in some embodiments, is a private cache associated with only the second processor core 106. In another embodiment, the second cache 110 is associated with the second processor core 106 and one or more other processor cores.

In an alternative embodiment, the first processor core 104 and the second processor core 106 are associated with the first cache 108. Both the first processor core 104 and the second processor core 106 access data on the first cache 108.

The main memory 112, in one embodiment, is an integrated circuit that stores computer data. For example, the main memory 112 may be random-access memory (RAM). In some embodiments, the main memory 112 is a volatile memory. In another embodiment, the main memory 112 is a non-volatile memory.

The main memory 112 stores an in-memory database (IMDB) 114. The IMDB 114 contains one or more tables of tuples that describe business data. The BI query operates on data from the IMDB 114. The IMDB 114 may store the tuples that describe business data in any type of memory, including one or more of random access memory (RAM), on-chip cache, off-chip cache, a disk, or another type of memory.

In one embodiment, the IMDB 114 may be divided into one or more blocks of data 116. The blocks of data 116, in some embodiments, represent an arbitrary division of the business data in the IMDB 114 into groups of similar size so that each block of data 116 includes a subset of the data in the IMDB 114. One or more blocks of data 116 are transferred to the first cache 108 or the second cache 110 and stored for access by the first processor core 104 or the second processor core 106. The blocks of data 116 do not necessarily represent logical or physical divisions of the business data; rather, the blocks of data 116 may simply be created as data is read into the first cache 108 or the second cache 110.

Figure 2:
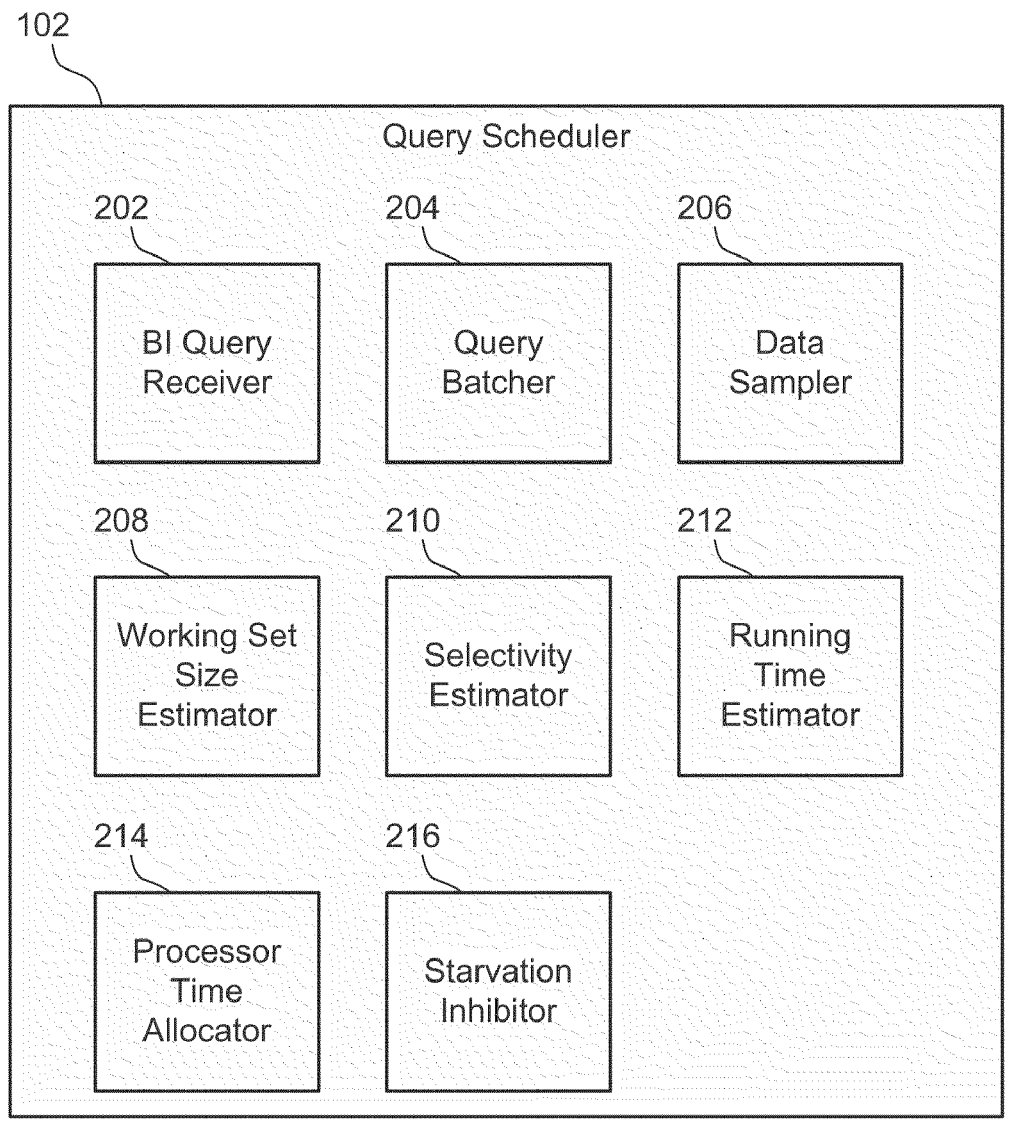
FIG. 2 depicts a schematic diagram of one embodiment of the query scheduler of FIG. 1.

FIG. 2 depicts a schematic diagram of one embodiment of the query scheduler 102 of FIG. 1. The query scheduler 102 includes a BI query receiver 202, a query batcher 204, a data sampler 206, a working set size estimator 208, a selectivity estimator 210, a running time estimator 212, a processor time allocator 214, and a starvation inhibitor 216. In general, the query scheduler 102 schedules the processing of queries on two or more processor cores to improve processing time.

The BI query receiver 202, in one embodiment, receives a BI query. The BI query receiver 202 transmits the BI query to a staging area (not shown) where the BI query waits with other queries until they are placed in a batch for processing by the query batcher 204.

In some embodiments, the BI query receiver 202 operates in a dynamic environment where a plurality of BI queries are received at varying times. In a dynamic environment, the BI query receiver 202 continues to deliver queries to the staging area.

The query batcher 204 creates one or more batches of queries from the queries in the staging area. The query batcher 204 assigns queries to batches based on inputs from many of the other components of the query scheduler 102, described below. The query batcher 204 transmits the batches of queries to a processor core for processing against a block of data 116.

The data sampler 206, in one embodiment, samples data from the IMDB 114 for use by other components of the query scheduler 102. In some embodiments, the data sampler 206 collects a random sample of data from the IMDB 114. In one embodiment, the data sampler 206 randomly selects a group of neighboring data elements from the IMDB 114.

The working set size estimator 208 estimates a size of a working set. In one embodiment, the working set size estimator 208 runs a query against the sample of data from the data sampler 206. In some embodiments, the working set size estimator 208 monitors a number of distinct groups encountered and determines a cumulative size of the distinct groups encountered as the query runs against the sample until the number of distinct groups represents almost every access to the data or the groups encountered would not fit into the first cache 108. If the number of distinct groups represents almost every access to the data, the working set size estimator 208 estimates the working set size as the size of the distinct groups encountered. If the groups encountered would not fit into the first cache 108, the working set size estimator 208 estimates the size of the working set as "too large."

The working set size estimator 208, in one embodiment, transmits the working set size to the query batcher 202 for use in selecting queries for batches. In some embodiments, a query with a working set size smaller than the cache size is classified as "could share," meaning it may be a candidate for inclusion in a batch with other queries, based on further determinations. In certain embodiments, the query batcher 202 classifies a query with a working set size larger than the cache size as "never share," meaning it should not be included in a batch with other queries, based on further determinations.

The selectivity estimator 210, in one embodiment, estimates a selectivity for a query. One embodiment of the selectivity estimator 210 operates by processing a query against the sample data from the data sampler 206 and determining how many tuples pass a selection predicate for the query. If the number of tuples passing the selection predicate is below a threshold, the selectivity is determined to be low. The selectivity estimator 210, in certain embodiments, transmits the selectivity estimate to the query batcher 204, and the query batcher 204 classifies the query as "always share" if the selectivity is low, meaning that the query is a good candidate for inclusion with other queries in a batch.

The running time estimator 212, in one embodiment, estimates a running time for a query by timing the query as it runs against the sample from the data sampler 206. In one embodiment, the query is timed while it runs for another component of the query scheduler 102. For example, the running time estimator 212 may time the query as it is processed for the working set size estimator 208. In some embodiments, the query batcher 204 uses the running time estimate to determine which queries to batch together. In one embodiment, the query batcher 204 includes queries in the same batch if the running time estimates for the queries differ by less than a running time threshold. For example, in one embodiment, the running time estimator 212 determines a first query running time for a first query and determines a second query running time for a second query. The query batcher 204 determines the difference between the first query running time and the second query running time and places the first query and the second query in a batch if the difference is less than a running time threshold.

The processor time allocator 214 allocates processor time to a batch of queries relative to other batches of queries, in one embodiment, to promote fair scheduling of query batches. In certain embodiments, the processor time allocator 214 allocates processing time to a batch of queries in proportion to the number of queries in the batch of queries. For example, a batch having five queries would be allocated more processor time than a batch having three queries. In one embodiment, a first batch of queries includes a first quantity of queries and a second batch of queries includes a second quantity of queries. The processor time allocator 214 allocates a first processing time to the first batch of queries and a second processing time to the second batch of queries in proportion to the first quantity of queries and the second quantity of queries.

The starvation inhibitor 216 schedules queries for processing when the other components of the query scheduler 102 would otherwise not schedule them. In one embodiment, the starvation inhibitor 216 schedules queries when no other batches of queries are being processed. For example, when queries determined by the query scheduler 102 to be efficiently batchable have been completed, the starvation inhibitor 216 may pack the remaining queries into one or more batches for processing. In another example, the starvation inhibitor 216 may pack a query into a batch for processing when the query has been in the staging area for longer than a time boundary threshold.

FIG. 3b depicts one embodiment of a method 300 for processing multiple queries over multiple processor cores. Query processors that run concurrent queries may operate in a multi-threaded fashion, where each thread handles a query at a time. When this model is applied to a main-memory, multicore system, each thread runs on a core and scans data from memory. The challenge of I/O sharing is to optimize the memory access so that the threads are always busy doing work, and are not bound by memory bandwidth. Main memory databases lack buffer pools, instead relying on hardware to read data into the processor's caches.

Even in the absence of a buffer pool, IMDB's 114 can attain some speedup through "incidental" I/O sharing, which occurs because of the convoy phenomenon. For example, multiple queries, running on different cores, start scanning a table at approximately the same time. The first query will incur a cache miss to read each tuple from main memory. The remaining queries, however, can take advantage of the data that the "trailblazer" query has read into the processor's shared L2 or L3 cache. The queries form a "convoy" behind whichever query is furthest along in scanning the table; slower queries can catch up while faster queries wait for the memory controller to respond. As used herein, the term "NaiveSharing" describes the traditional multithreaded approach to scheduling query execution, which achieves limited I/O sharing via the convoy phenomenon.

In some embodiments, other methods for scan sharing obtain significantly more I/O sharing—and hence better performance—than NaiveSharing. As used herein "FullSharing" describes one embodiment of such a method. Here, each processing thread executes a separate table scan. A given thread feeds each block of tuples through every query before moving onto the next block. FIGS. 3a and 3b show how FullSharing's query scheduling contrasts with that of NaiveSharing. FullSharing inverts the traditional division of work within the database: instead of executing an entire query at a time, each thread "executes" a block of data 116 at a time across all queries. Some of the benefits of FullSharing over NaiveSharing are easy to demonstrate.

Figure 4:
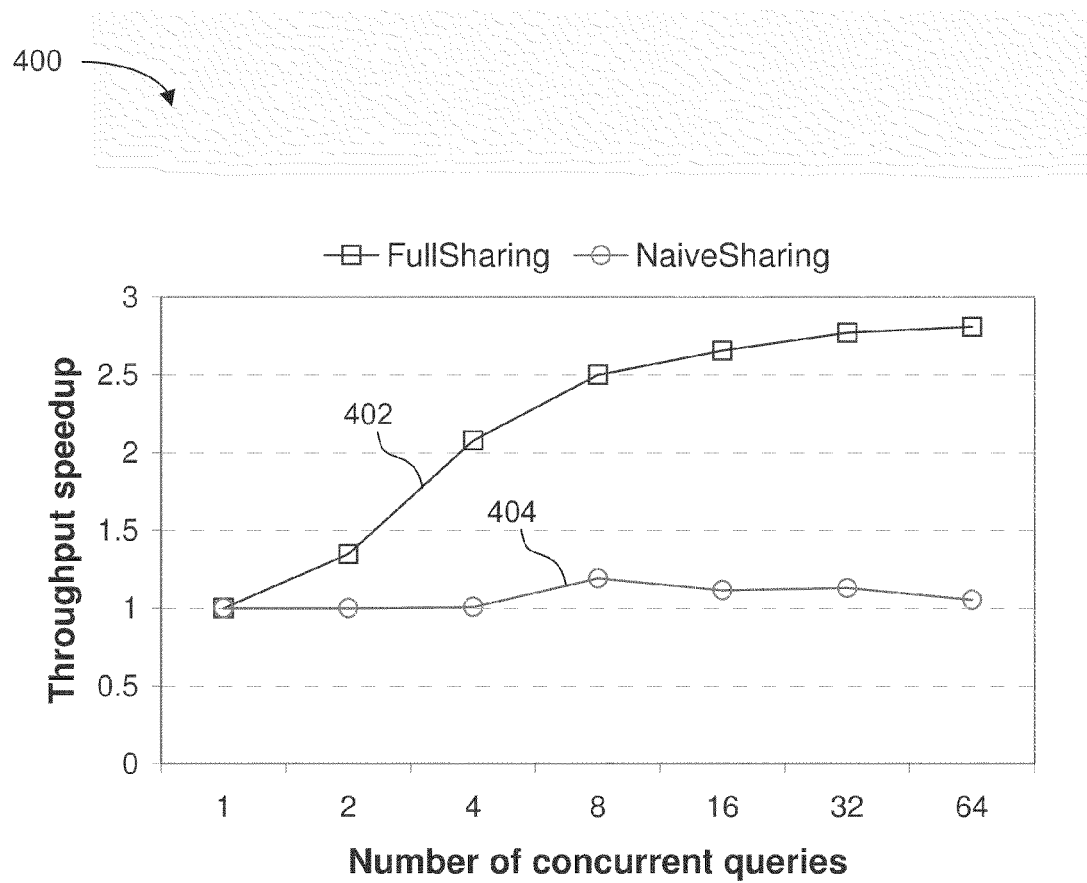
FIG. 4 depicts a graph showing possible results of an 8-core server running a batch query workload consisting of multiple copies of a query.

FIG. 4 is a graph 400 showing possible results of an 8-core server running a batch query workload consisting of multiple copies of a query, first using NaiveSharing to schedule the 8 cores, and then using FullSharing. The graph shows a line illustrating throughput speedup for FullSharing 402 and another line showing throughput speedup for NaiveSharing 404. The graph compares overall throughput against the throughput of the one-query workload. As the number of queries in the system increases, FullSharing is able to amortize memory I/O across the entire group of queries, more than doubling its query throughput. Beyond four concurrent queries, NaiveSharing achieves some speedup through I/O sharing. However, the speedup is negligible compared to that of FullSharing. Even though all the queries in the workload are identical and start at the same time, the convoy effect is not sufficient to induce effective sharing of memory I/O.

FullSharing, in one embodiment, is implemented in a query scheduler 102 of a query processor. The query scheduler 102 runs a workload Q of queries by creating a pool of work-units, where each work-unit corresponds to a block of data 116. Each thread steals work from this pool as follows:

Repeat until the pool is empty:
Pick a block of data 116 from the pool of work-units.
Scan this block of data 116.
For every query $q \in Q$, apply q on this block of data 116.

The overall goal of scan-sharing in an IMDB 114 is to reduce the number of cache misses. Embodiments of the FullSharing technique achieve this goal by loading tuples into a first cache 108 once, then sharing them among multiple queries. However, applying FullSharing too aggressively can lead to more cache misses, due to an effect referred to herein as "agg-table thrashing."

A query that scans a table typically streams the results of the scan into another operation, such as index nested loops join or grouped aggregation. To run efficiently, these operations require fast access to a "working set" of data structures like indexes or hash tables. If too many queries share a scan, their working sets can overflow the first cache 108. Once this situation occurs, the queries start to thrash, incurring frequent cache misses to fetch portions of their working sets. The resulting accesses to main memory 112 can easily negate the benefits of scan-sharing. The working set of a query may include primarily the agg-table data structure; hence, the name "agg-table thrashing" describes this effect.

Figure 5:
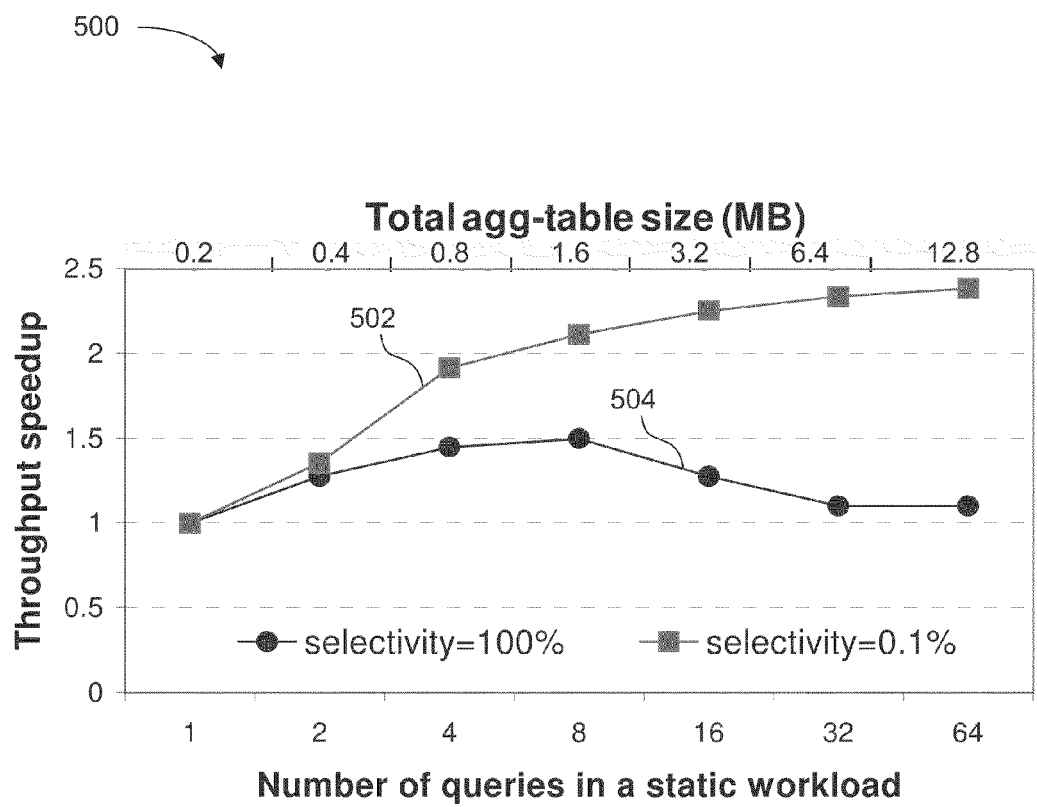
FIG. 5 depicts a graph showing experimental results that determine conditions of agg-table thrashing.

FIG. 5 is a graph 500 that shows a small subset of experimental results that illustrate the conditions of agg-table thrashing. The experiments behind FIG. 5 use FullSharing to share a single scan between multiple copies of a given query. The number of simultaneous queries varies from 1 to 64 and the resulting throughput improvement is measured. The two lines in the graph show the performance improvement for two variants of a query: a first variant 502 with a selectivity of 100%, and a second variant 504 with a selectivity of 0.1%. Modifying a WHERE clause of the query, changing the query selectivities to 100% and 0.1%, respectively, produce these variants. The high-selectivity query experiences agg-table thrashing, suffering a performance reduction when more than 8 queries run simultaneously.

The experiments show two factors that determine whether agg-table thrashing will occur: query selectivity and working set size. The results in FIG. 5 illustrate these two factors. The effects of selectivity are most readily apparent: The high-selectivity query thrashes, while the low-selectivity query does not. In general, queries with selectivities of 0.1% or less do not exhibit agg-table thrashing.

The effects of working set size can also be seen by focusing on points at which thrashing occurs: in the case of FIG. 5, at all points beyond 8 queries. The agg-tables for the queries shown here take up 200 KB of memory each. The secondary scale across the top of the graph shows the total size of the agg-tables across all queries. The test machine had two 4 MB L2 caches, each split between two cores. Effectively, each core has 2 MB of cache. The block size was 400K, leaving 1.6 MB of space per core for the queries' working sets. When the total agg-table size exceeds 1.6 MB, the queries start to thrash. The experiments have verified this result across queries with selectivities from 1 to 100 percent and agg-table sizes ranging from 30 KB to 3.2 MB.

To summarize, a scan-sharing technique that avoids agg-table thrashing achieves high benefits from shared scans. The two factors that determine whether thrashing will occur are query selectivity and working set size.

Figure 6:
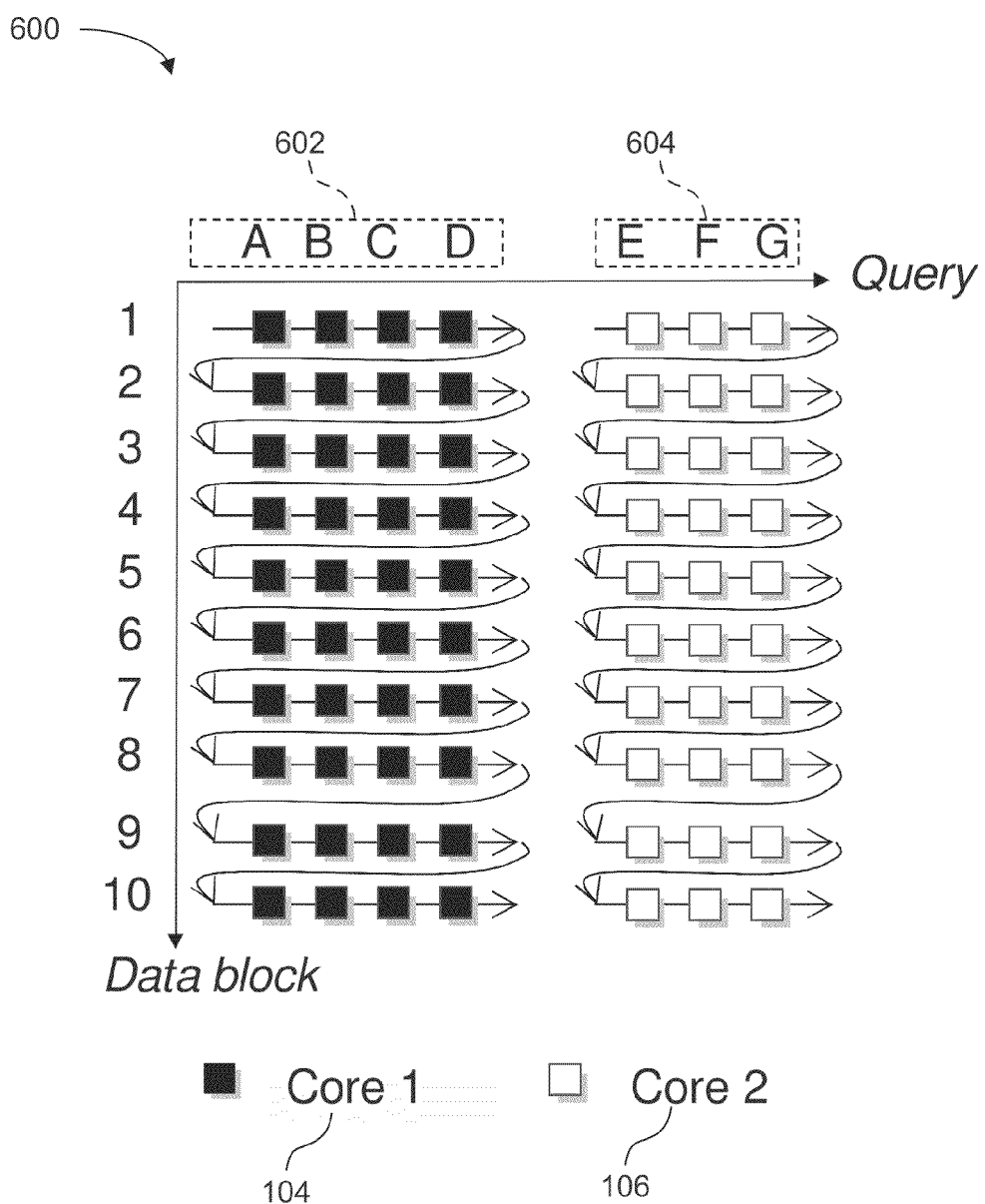
FIG. 6 depicts a schematic diagram of one embodiment of a method for scan sharing using batches.

FIG. 6 depicts one embodiment of a method 600 for scan sharing using batches. One embodiment of a scan sharing process prevents thrashing by grouping together smaller numbers of queries into batches. As used herein, this process is referred to as "BatchSharing." BatchSharing, in one embodiment, includes processing a first batch of queries 602 and a second batch of queries 604 on a first processor core 104 and a second processor core 106, respectively. In one embodiment, each processor core shares a single scan among the queries from one batch. In one embodiment, if one core finishes its batch before the other, the idle core steals work from the remaining batch.

Figure 7:
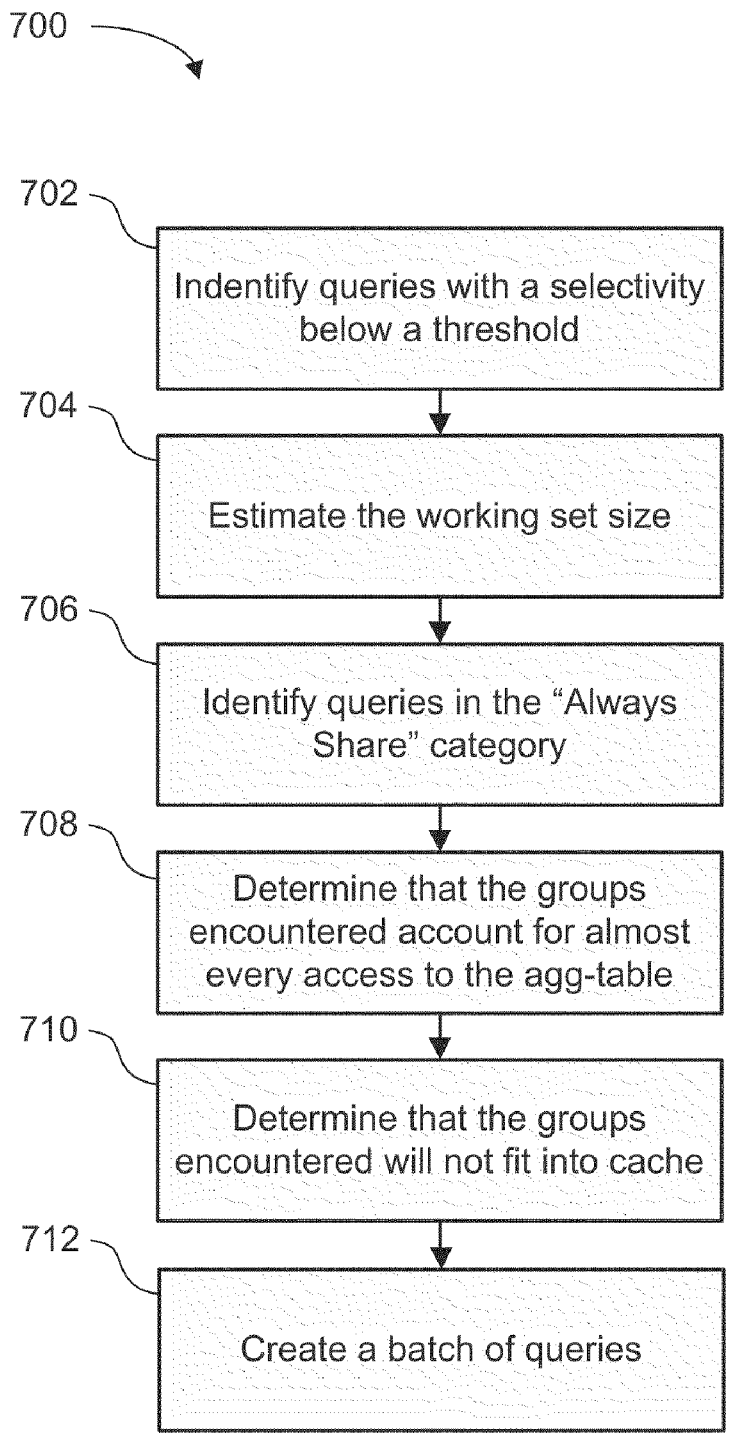
FIG. 7 is a flowchart diagram depicting one embodiment of a method for scan sharing using batches.

FIG. 7 is a flowchart diagram depicting one embodiment of a method 700 for scan sharing using batches. The method 700 is, in certain embodiments, a method of use of the systems and apparatuses of FIGS. 1-6, and is described with reference to those figures. Nevertheless, the method 700 may also be conducted independently thereof and is not intended to be limited to the specific embodiments discussed above with respect to those figures.

Implementation of BatchSharing is difficult, because it is hard to determine whether a given set of queries can share a scan without thrashing. For ease of exposition, this embodiment describes a "static" version of BatchSharing. That is, the embodiment assumes that the system is executing a single workload of queries (as in a report-generation scenario) all at once. Further, the embodiment assumes that the goal of the system is to finish this entire workload as quickly as possible without regard for the relative running times of individual queries. This scenario is analogous to running daily reporting queries over a data warehouse. In another embodiment, these assumptions are relaxed, and an embodiment of BatchSharing handles dynamic query arrival while ensuring a fair division of system resources among queries. This "dynamic" version of BatchSharing is described in greater detail below.

For queries in one embodiment of an IMDB 114, the working set is dominated by the agg-table. In general, there is no known efficient (i.e., sampling-based) method to estimate the number of rows in an agg-table—i.e., the number of groups that the query's GROUP BY clause produces—with guaranteed error bounds. However, by carefully defining the estimation problem, a sampling-based technique may be employed to estimate the parameters using three key observations:

OBSERVATION 1: Queries can be classified into 3 categories:

Always share: If a query is highly selective (for example, <0.1%), it can be grouped with any other query without thrashing.

Never share: If a query's working set size exceeds the size of cache, adding that query to any batch will lead to thrashing.

Could share: If a query does not fit into the previous two categories, then the system estimates the query's working set size to know whether it can be safely added to a given batch.

OBSERVATION 2: Some parts of a query's agg-table are accessed very rarely, while others are accessed frequently; thus the working set can be viewed, by approximation, as the set of groups that are used to account for a portion of accesses to the query's agg-table (the portion may be a tunable parameter). If this working set resides in cache, thrashing will not occur.

OBSERVATION 3: It is easier to estimate a query's working set size from a sample than it is to estimate the size of its agg-table, because hard-to-capture rare values impact the distinct-value count but not working-set size. Working-set size is closely related to the classical statistical notion of "sample coverage," and techniques for estimating sample coverage are applicable.

These observations allow conversion of a potentially hard estimation problem into a tractable one.

In the method 700, the selectivity estimator 210 identifies 702 queries with selectivities of less than a threshold (for example, 0.1%), and the working set size estimator 208 identifies queries with working sets that exceed the size of cache. Then, for the remaining queries, the working set size estimator 208 estimates 704 the working-set size.

In one embodiment, parameters are determined using two phases of sampling. Each phase operates over preallocated random samples of the table being scanned. The selectivity estimator 210 identifies 706 queries in the "always share" category. This phase proceeds by running the query over a sample of the table. If very few tuples pass the query's selection predicate, the query is marked as "always share." This phase works well because it is relatively easy to estimate predicate selectivities on the order of 0.1% or higher from a sample.

In one embodiment of the second phase, the working set size estimator 208 feeds a sample of the table through the query while monitoring the number of distinct groups encountered thus far. The working set size estimator 208 stops either in response to determining 708 that the groups encountered thus far account for almost every access to the agg-table (as measured by sample coverage) or in response to determining 710 that the groups encountered thus far would not fit into cache. In the latter case, the query is classified as "never share," whereas in the former case, the method 700 returns the number of groups encountered thus far as its estimate of the working-set size. This phase works well because the coverage estimator is accurate as long as the actual number of groups in the working set is sufficiently small relative to the number of tuples in the sample. For example, by definition, every "could share" query meets this criterion, because one example of a processor cache can only hold roughly 10,000 agg-table entries.

After the two phases of sampling, the method 700 has collected enough information to decide which queries can be safely batched together, and the query batcher 204 creates 712 a batch of queries. In one example, sufficiently accurate results are obtained for both phases with sample sizes of less than 100,000 tuples. Even when running a highly complex query, a modern query processor, such as the Blink query processor, can scan such a small sample in less than 5 msec.

The result of the above estimation procedure is a quantification of the working set size $w_q$ for each query q that the system needs to assign to a batch. For "always share" queries, this working set size is effectively zero; for "never share" queries, the working set size is effectively infinite. The next stage of BatchSharing uses this working set information to pack the queries into batches.

In certain embodiments, the goal of the packing method is to minimize per-batch overheads by packing the queries into as few batches as possible, while avoiding agg-table thrashing. To prevent thrashing, the process ensures that there is enough space in the cache for the working set of every query in a given batch. That is, if C is the size of the cache and B is the size of a block of data, then the process determines that the queries in a batch have a total working set size of less than C−B.

This constraint is based on a conservative model of cache behavior. Let $\gamma$ denote the fraction of memory accesses covered by each query's working set. The process assumes that a cache controller (not shown) will keep the most popular $\gamma$th percentile of memory in cache for each query. As long as this invariant holds, the overall cache miss rate across the queries in the batch is bounded from above by 1−$\gamma$. In another embodiment, the cache controller will use a global replacement policy to allocate cache lines across all queries in a batch; it is assumed that this policy will achieve a lower miss rate than the simplified policy.

More formally, the packing problem is: Given a set Q of queries and corresponding working set sizes $w_q$, find a partitioning:

$$Q = Q_1 \uplus Q_2 \uplus \ldots \uplus Q_p,$$

that minimizes p, subject to the constraint:

$$\sum_{q \in Q_i} w_q + B \leq C, \forall\, 1 \leq i \leq p,$$

where C is the size of the cache and B is the size of a block of tuples (Agg-table thrashing occurs when the total working set of the queries in a batch is greater than C−B bytes).

The embodiment of BatchSharing described above assumes a single static workload of queries. In another embodiment, BatchSharing is extended to handle an online environment with dynamic query arrival, as in a data warehouse supporting a stream of analyst queries.

In one embodiment, queries are still run in batches, with the combined working set of each batch fitting in the L2 cache to avoid agg-table thrashing. The basic methods from the previous embodiment of BatchSharing on estimating the agg-table size of each query and on packing queries into batches still apply, but batches are formed and maintained for a dynamic query stream.

In one embodiment, if a batch X of queries is running and a new query q arrives, q is added to X if the working set of X+ that of q fits in cache. In another embodiment, once a batch of queries has started running, it is treated as immutable.

In some embodiments, at any point in time, the queries in the system fall into two categories: active and unassigned. Active queries were assigned to query batches; these active batches are in the process of being executed over shared scans. Unassigned queries are not yet part of a batch; these queries reside in a special staging area until they are assigned to a batch.

Dynamic workloads, in some embodiments, arise in interactive applications, with concurrent users submitting queries from their individual consoles. In some embodiments, these users see consistent query response times. To function correctly in such an environment, a query processor schedules queries fairly and avoids starvation. One embodiment of dynamic BatchSharing implementation targets two kinds of fairness:

Fair scheduling: On average, every active query receives an equal fraction of CPU time to within a constant multiplicative factor d.

No starvation: As long as the system is not overloaded, the amount of time that a query can be in the unassigned state is strictly bounded.

Since the queries in a given batch share a scan, in one embodiment, it follows that queries in the batch should complete within a similar time. If a batch contains both fast and slow queries, the faster queries will receive a smaller slice of the CPU, violating fair scheduling. To avoid this problem, constraints are incorporated on query running time into the bin-packing method, in one embodiment. A given pair of queries are allowed to share a batch in response to their running times differing by a factor of less than d. In some embodiments, d is chosen experimentally. Since some embodiments of the process do table scans, query running times can be easily estimated from running the query on a sample, in these embodiments.

Another obstacle to fairness is the relative weight of different batches in scheduling the activities of the CPU's cores. If two batches of unequal size receive equal slices of CPU time, the queries in the smaller batch will receive a greater share of CPU. To avoid such imbalances, some embodiments of the process allocate processor time to each batch proportionally to its size.

In one embodiment, lottery scheduling allots processor time. A running batch receives a number of lottery tickets proportional to the number of queries in the batch. A mapping from tickets to batches is stored in an array, where each entry represents a single ticket. Time is divided into slices that are sufficiently large to amortize the overhead of flushing the processor's L2 cache. At the start of a time slice, a core chooses a lottery ticket uniformly at random and executes the corresponding batch for the remainder of the time slice. Overall, the expected amount of CPU time that each batch receives is proportional to its number of tickets and, hence, to its number of queries.

To prevent starvation, one embodiment of BatchSharing enforces an upper bound $t_w$, also referred to herein as a time boundary threshold, on the amount of time a query can be in an unassigned state. At the same time, keeping queries in the staging area as long as possible maximizes the opportunities for effective bin-packing. These two factors are balanced, in one embodiment, by tracking the original arrival time of each unassigned query.

During query processing, in one embodiment, the staging area is left untouched until one of the following occurs:

No more active queries remain, or

A query has spent more than $t_w$ time in the staging area.

When either of these events happens, it triggers the following sequence of actions, in one embodiment:

1. Pack all the unassigned queries into batches.
2. Activate any batch containing a query that has spent more than $t_w$ time in the pool.
3. Activate a batch if there are still no active batches.
4. Return the remaining queries to the staging area.

In some embodiments a working-set (WS) size is estimated for queries classified as "could-share." For a specified query q and real number $\gamma \in [0, 1]$, a working set $W_\gamma(q)$ may be defined as a minimal set of rows in the agg-table—not necessarily unique—that accounts for 100$\gamma$% of rows in the answer to q after predicates have been applied but prior to grouping. For example, if the cache comprises the rows in $W\gamma(q)$, then the cache-hit rate for query q (in isolation) will be $100\gamma$ %. For example, in one embodiment, a value of $\gamma=0.8$ is selected. Given a value of $\gamma$, (1) a query is classified as always-share if its selectivity a is less than a threshold $\sigma^*$, (2) a query is classified as never-share if the WS size will clearly exceed the space threshold $d^*=B-C$ allotted for the agg-tables, and (3) otherwise, $|W_\gamma(q)|$ is computed for purposes of bin packing.

To avoid expensive table scans, in one embodiment, the table T of interest is sampled, and $\sigma$ and $|W_\gamma(q)|$ are merely estimated. The classification steps (1)-(3) above are executed in this embodiment, but each step is modified to take into account the uncertainty due to sampling, using an "indifference-zone" approach. The indifference zone approach, in certain embodiments, includes Set $x_i=1$ if the ith row of T satisfies the predicates in q, and $x_i=0$ otherwise, so that $$\sigma = (1/|T|)\sum_{i=1}^{|T|} x_i.$$

Also set $$\alpha^2 = (1/|T|)\sum_{i=1}^{|T|} (x_i - \sigma)^2.$$

To determine whether $\sigma<\sigma^*$, the predicates in q are applied to a simple random sample of n rows from table T. Set $X_i=1$ if the ith sampled row satisfies the predicates in q, and $X_i=0$ otherwise. The process, in one embodiment, estimates $\sigma$ by $$\hat{\sigma}_n = (1/n)\sum_{i=1}^{n} X_i,$$

$X_i$, and classify q as always-share if $\hat{\sigma}_n<\sigma^*-\epsilon_n$.

The formulas for n and $\epsilon_n$ are given below, and, in certain embodiments, are chosen so that the probability of a "type-1" or "type-2" error is less than a user-specified threshold p. A type-1 error occurs if $\sigma>\sigma^*+\delta_2$ but $\hat{\sigma}<\sigma^*-\epsilon_n$, where $\delta_2$ is an "indifference" constant. That is, a type-1 error occurs if a lies "significantly" above $\sigma^*$, as measured by $\delta_2$, but one embodiment of the process, which uses $\hat{\sigma}$, incorrectly classifies query q as always-share. Similarly, a type-2 error occurs if $\sigma<\sigma^*-\delta_1$ but $\hat{\sigma}>\sigma^*-\epsilon_n$. If $\sigma$ lies in the interval $[\sigma^*-\delta_1, \sigma^*+\delta_2]$, then certain embodiments of BatchSharing can tolerate a misclassification. In general, the repercussions of a type-1 error are much more serious than those of a type-2 error.

In some embodiments, suitable values of the foregoing constants are given by $\sigma^*=0.001$, $\delta_1=\sigma^*$, and $\delta_2=0.099$.

Specifically, in one embodiment, parameters are set as $$n = \left(\frac{2\alpha z_{1-p}}{\delta_1}\right)^2 \vee n_{min}$$

and $$\epsilon_n = \left(\frac{\alpha z_{1-p}}{\sqrt{n}} - \delta_2\right)^+$$

where $n_{min}\approx 500$, $z_x$ is the 100x% quantile of the standard (mean 0, variance 1) normal distribution, $x \vee y=\max(x, y)$, and $x^+=\max(x, 0)$. Note that the constant $\alpha$ appearing in the above formulas is unknown; in some embodiments a small pilot sample of size $m=n_{min}$ is used to estimate $\alpha$ by $$\hat{\alpha}_m^2 = (m-1)^{-1}\sum_{i=1}^{m}(X_i - \hat{\sigma}_m)^2.$$

To see that use of the foregoing values achieves (approximately) the desired error control, observe that $$P\{\text{type} - 1 \text{ error}\} = P\{\hat{\sigma}_n < \sigma^* - \epsilon_n\}$$

$$= P\left\{\frac{\hat{\sigma}_n - \sigma}{\alpha/\sqrt{n}} < \frac{\sigma^* - \sigma}{\alpha/\sqrt{n}} - \frac{\epsilon_n}{\alpha/\sqrt{n}}\right\}$$

$$\leq P\left\{\frac{(\hat{\sigma}_n - \sigma)}{\alpha/\sqrt{n}} < \frac{\delta_2}{\alpha/\sqrt{n}} - \left(z_{1-p} - \frac{\delta_2}{\alpha/\sqrt{n}}\right)^+\right\}$$

$$\leq P\left\{\frac{\hat{\sigma}_n - \sigma}{\alpha/\sqrt{n}} < -z_{1-p}\right\}$$

$$\approx p,$$

where the last $\approx$ follows from the central limit theorem (CLT) and the definition of $z_{1-p}$. Similarly, $$P\{\text{type} - 2 \text{ error}\} = P\{\hat{\sigma}_n > \sigma^* - \epsilon_n\}$$

$$= P\left\{\frac{\hat{\sigma}_n - \sigma}{\alpha/\sqrt{n}} > \frac{\sigma^* - \sigma}{\alpha/\sqrt{n}} - \frac{\epsilon_n}{\alpha/\sqrt{n}}\right\}$$

$$\leq P\left\{\frac{\hat{\sigma}_n - \sigma}{\alpha/\sqrt{n}} > \frac{\delta_1}{\alpha/\sqrt{n}} - z_{1-p}\right\}$$

$$\leq P\left\{\frac{\hat{\sigma} - \sigma}{\alpha/\sqrt{n}} > z_{1-p}\right\}$$

$$\approx p.$$

To obtain a reasonable estimate of the working-set size for a query q, in one embodiment, a uniform multiset sample W of grouping values is incrementally maintained by incrementally sampling table T; for each sampled tuple, all of the predicates in q are applied and, if the tuple survives, it is projected onto the grouping attributes before adding it to W. After each incremental sampling step, the coverage V of the set D(W) of distinct grouping values in W is estimated. Denoting by $T^*$ the reduced version of T obtained by applying the selection predicates in q, the coverage is defined as $\sum_{i\in D(W)} \pi_i$, where $\pi_i$ is the fraction of rows in $T^*$ whose grouping values match the ith value in D(W). If $V\geq\gamma$, the sampling process is stopped in one embodiment and the number of rows is used in W as the estimate of the working-set size. The idea is that the most frequent grouping values will appear in W, so that W will be approximately minimal. As with query selectivity, the test of whether or not $V\geq\gamma$ is modified in one embodiment to take into account the uncertainty introduced by sampling, using an indifference-zone approach.

In more detail, when W contains n elements, the coverage V is estimated, in one embodiment, by $\hat{V}_n=1-f_1/n$, where $f_j [1\leq j\leq |D(W)|]$ is the number of distinct grouping values that appear exactly j times in W. In certain embodiments, an indifference zone is chosen of the form $[\gamma-\delta'_1, \gamma+\delta'_2]$ and $$n' = \left(\frac{2\beta_n z_{1-p}}{\delta'_2}\right)^2 \vee n_{min},$$

and $$\epsilon'_n = \left(\frac{\beta_n z_{1-p}}{\sqrt{n}} - \delta'_1\right)^+,$$

are set where $\beta_n = (f_1/n) + 2(f_2/n) - (f_1/n)^2$. Then, provided that $|W| \geq n'$, $V \geq \gamma$ is determined if and only if $\hat{V}_{|W|} > \gamma + \epsilon'_{|W|}$. An argument similar to the one given above shows that, to a good approximation, the probability of a type-1 or type-2 error will be at most p. In one example, indifference-zone values of $\delta'_1 = 0.05$ and $\delta'_2 = 0.10$ are used.

FIG. 8 depicts one embodiment of a method 800 for query classification and working set size estimation. In the method 800, the function DISTINCT(W) computes the number of distinct elements in W, and NUMWITHFREQ(W, i) computes the quantity $f_i$ defined previously. The function SAMPLE(T,n) takes a simple random sample of n rows from table T, without replacement. The function INCREMENTSAMPLE(W, T, i) repeatedly samples from T until a sampled tuple survives the predicates in q. This tuple is then projected onto the grouping attributes and added to W. The sampling from T is incremental within and between function calls; the variable i records the cumulative number of tuples that have been sampled from T over all calls to INCREMENTSAMPLE.

This is made efficient, in some embodiments, by precomputing a sample T' of 100 k rows, and storing them in random order, so that incremental sampling of T corresponds to a simple scan of T'. In one embodiment, $n_{max} = |T'|$ is set, so that if the sample becomes exhausted at any point (lines 14 and 25), the method terminates and conservatively categorizes query q as never-share. In practice, the same sample T' can be used for both the selectivity test (pilot and regular samples) and the WS size-estimation phase, without much adverse impact on the effectiveness of one embodiment of BatchSharing. Finally, note that, in line 26, DISTINCT(W) is essentially a lower bound on the size of the working set, so that the test in line 26 indeed identifies whether q is a never-share query.

In many applications, the multicore trend in processors has proven difficult to leverage: clock speeds are decelerating, programs must be rewritten to work on multiple processors, parallel programs do not scale easily, and enterprise software performs poorly. In the context of a compressed IMDB, however, embodiments of the processes referred to as FullSharing and BatchSharing provide a solution that achieves near linear speedup of query throughput when running an 8-query workload on a server with 8 cores.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to receive a plurality of business intelligence (BI) queries, store a block of data in a first cache, scan the block of data in the first cache against a first batch of queries, and scan the block of data against a second batch of queries. The first cache is associated with a first processor core. The block of data includes a subset of data stored in an in-memory database (IMDB). The block of data is scanned against the first batch of queries on the first processor core. The first batch of queries includes two or more of the BI queries. The block of data is scanned against the second batch of queries on the second processor core. The second batch of queries includes two or more of the BI queries that are not included in the first batch of queries.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A computer program product comprising a non-transitory computer useable storage medium to store a computer readable program, wherein the computer readable program, when executed on a computer, causes the computer to perform operations comprising:
    receiving a plurality of queries;
    storing a block of data in a first cache associated with a first processor core, the block of data comprising a subset of data stored in an in-memory database (IMDB);
    running a query of the plurality of queries over a sample of the data stored in the IMDB;
    determining that the query may be placed in a batch with other queries in response to determining that a number of tuples that pass a selection predicate of the query is below a threshold;
    monitoring a number of distinct groups encountered by running the query;
    estimating a working set size for the query as the number of distinct groups encountered in response to determining that the cumulative size of the distinct groups encountered is less than or equal to the size of the first cache minus the size of the block of data;
    batching the queries based, at least in part, on the estimated working set size;
    scanning the block of data in the first cache against a first batch of queries on the first processor core, the first batch of queries comprising two or more of the queries; and
    scanning the block of data against a second batch of queries on a second processor core, the second batch of queries comprising one or more of the queries exclusive of the queries included in the first batch of queries.

2. The computer program product of claim 1, further comprising storing the block of data in a second cache associated with the second processor core, and wherein scanning the block of data against the second batch of queries comprises reading the block of data from the second cache.

3. The computer program product of claim 1, wherein the first cache is further associated with the second processor core, and wherein scanning the block of data against the second batch of queries comprises reading the block of data from the first cache.

4. The computer program product of claim 1, further comprising:
    running a query of the plurality of queries over a sample of the data stored in the IMDB;
    monitoring a cumulative size of distinct groups encountered by running the query; and
    determining that the query may not be placed in a batch with other queries in response to determining that the cumulative size of the distinct groups encountered is greater than a size of the first cache.

5. The computer program product of claim 1, further comprising:
    determining that the query may be placed in a batch with other queries in response to determining that a total of estimated working set sizes for the query and the other queries is less than or equal to the size of the first cache; and
    placing the query and the other queries into the first batch of queries.

6. The computer program product of claim 1, further comprising:
    determining a first query running time for a first query;
    determining a second query running time for a second query; and
    placing the first query and the second query into the first batch of queries in response to determining that the first query running time and the second query running time differ by less than a running time threshold.

7. The computer program product of claim 6, wherein determining the first query running time comprises measuring a time required for the first query to run on a sample of the data stored in the IMDB.

8. The computer program product of claim 1, further comprising allocating a first processing time to the first batch of queries and a second processing time to the second batch of queries in proportion to a first quantity of queries in the first batch of queries and a second quantity of queries in the second batch of queries.

9. The computer program product of claim 8, wherein the first processing time is allocated by lottery scheduling.

10. The computer program product of claim 1, further comprising:
    in response to determining that no queries previously assigned to any batch of queries remain unprocessed:
        placing all unassigned queries into one or more new batches of queries;
        processing a new batch of queries of the one or more new batches of queries in response to determining that a query in the new batch of queries has been waiting to be processed for longer than a time boundary threshold;
        processing a new batch of queries of the one or more new batches of queries in response to determining that no other batches of queries are being processed in response to determining that a query in another new batch of queries of the one or more batches of new queries has been waiting to be processed for longer than the time boundary threshold; and
        returning any unprocessed queries in the one or more new batches of queries to an unassigned state.

11. The computer program product of claim 1, further comprising:
    in response to determining that a query has been waiting to be assigned to a batch of queries for longer than a time boundary threshold:
        placing all unassigned queries into one or more new batches of queries;
        processing a new batch of queries of the one or more new batches of queries in response to determining that a query in the new batch of queries has been waiting to be processed for longer than the time boundary threshold;
        processing a new batch of queries of the one or more new batches of queries in response to determining that no other batches of queries are being processed in response to determining that a query in another new batch of queries of the one or more batches of new queries has been waiting to be processed for longer than the time boundary threshold; and
        returning any unprocessed queries in the one or more new batches of queries to an unassigned state.

12. The computer program product of claim 1, further comprising receiving a second query workload comprising one or more queries, and wherein the first batch of queries further comprises one or more queries of the second BI query workload.

13. A computer-implemented method comprising:
    receiving a plurality of business intelligence (BI) queries;
    storing a first block of data in a first cache associated with a first processor core, the first block of data comprising a first subset of data stored in an in-memory database (IMDB);
    storing a second block of data in a second cache associated with a second processor core, the second block of data comprising a second subset of data stored in the IMDB;

running a query of the plurality of queries over a sample of the data stored in the IMDB;

determining that the query may be placed in a batch with other queries in response to determining that a number of tuples that pass a selection predicate of the query is below a threshold;

monitoring a number of distinct groups encountered by running the query;

estimating a working set size for the query as the number of distinct groups encountered in response to determining that the cumulative size of the distinct groups encountered is less than or equal to the size of the first cache minus the size of a block of data;

batching the queries based, at least in part, on the estimated working set size;

scanning the first block of data in the first cache against a batch of queries on the first processor core, the batch of queries comprising two or more of the BI queries; and scanning the second block of data in the second cache against the batch of queries on the second processor core.

14. The computer-implemented method of claim 13, wherein the first cache is a private cache accessible by the first processor core and the second cache is a private cache accessible by the second processor core.

15. The computer-implemented method of claim 13, wherein the first cache and the second cache are accessible by the first processor core.

16. A system for transmitting an operating system to a client computer, the system comprising:

a cache to store a block of data comprising a subset of data stored in an in-memory database (IMDB);

a query scheduler configured to:
receive a plurality of business intelligence (BI) queries;
run a query of the plurality of queries over a sample of the data stored in the IMDB:
determine that the query may be placed in a batch with other queries in response to determining that a number of tuples that pass a selection predicate of the query is below a threshold;
monitor a number of distinct groups encountered by running the query;
estimate a working set size for the query as the number of distinct groups encountered in response to determining that the cumulative size of the distinct groups encountered is less than or equal to the size of the cache minus the size of the block of data:
batching the queries based, at least in part, on the estimated working set size;
create a first batch of queries comprising two or more queries, at least one of the two or more queries in the first batch of queries comprising a query of the plurality of BI queries; and
create a second batch of queries comprising two or more queries;

a first processor core configured to scan the block of data against the first batch of queries, the first processor core connected to the cache; and a second processor core configured to scan the block of data against the second batch of queries, the second processor core connected to the cache.

17. The system of claim 16, wherein the first processor core is a central processing unit (CPU) core.

18. The system of claim 16, wherein the first processor core is a graphics processor unit (GPU) core.

* * * * *